United States Patent
Datla et al.

(10) Patent No.: US 11,868,720 B2
(45) Date of Patent: Jan. 9, 2024

(54) SYSTEM FOR MULTI-PERSPECTIVE DISCOURSE WITHIN A DIALOG

(71) Applicant: KONINKLIJKE PHILIPS N.V., Eindhoven (NL)

(72) Inventors: Vivek Varma Datla, Ashland, MA (US); Sheikh Sadid Al Hasan, Cambridge, MA (US); Aaditya Prakash, Waltham, MA (US); Oladimeji Feyisetan Farri, Yorktown Heights, NY (US); Tilak Raj Arora, Gurgaon (IN); Junyi Liu, Windham, NH (US); Ashequl Qadir, Melrose, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 347 days.

(21) Appl. No.: 17/420,750

(22) PCT Filed: Jan. 16, 2020

(86) PCT No.: PCT/EP2020/050954
§ 371 (c)(1),
(2) Date: Jul. 6, 2021

(87) PCT Pub. No.: WO2020/148355
PCT Pub. Date: Jul. 23, 2020

(65) Prior Publication Data
US 2022/0108068 A1  Apr. 7, 2022

Related U.S. Application Data

(60) Provisional application No. 62/793,611, filed on Jan. 17, 2019.

(51) Int. Cl.
*G06F 40/279* (2020.01)
*G06N 20/00* (2019.01)

(52) U.S. Cl.
CPC .......... *G06F 40/279* (2020.01); *G06N 20/00* (2019.01)

(58) Field of Classification Search
USPC ...................................... 704/1–504
See application file for complete search history.

(56) References Cited

U.S. PATENT DOCUMENTS 6,044,347 A   3/2000  Abella et al.
9,177,318 B2  11/2015 Shen et al.
(Continued)

OTHER PUBLICATIONS

PCT/EP2020/050954 ISR & Written Opinion, dated Apr. 30, 2020, 16 Page Document.
(Continued)

*Primary Examiner* — Marcus T Riley

(57) ABSTRACT

Techniques are described for training and/or utilizing sub-agent machine learning models to generate candidate dialog responses. In various implementations, a user-facing dialog agent (202, 302), or another component on its behalf, selects one of the candidate responses which is closest to user defined global priority objectives (318). Global priority objectives can include values (306) for a variety of dialog features such as emotion, confusion, objective-relatedness, personality, verbosity, etc. In various implementations, each machine learning model includes an encoder portion and a decoder portion. Each encoder portion and decoder portion can be a recurrent neural network (RNN) model, such as a RNN model that includes at least one memory layer, such as a long short-term memory (LSTM) layer.

15 Claims, 6 Drawing Sheets

(56) References Cited

U.S. PATENT DOCUMENTS

| | | | |
|---|---|---|---|
| 11,705,110 B2* | 7/2023 | Lee | G10L 15/22 |
| | | | 704/275 |
| 2010/0070448 A1* | 3/2010 | Omoigui | H01L 27/1463 |
| | | | 706/55 |
| 2012/0191716 A1* | 7/2012 | Omoigui | H01L 27/14647 |
| | | | 707/E17.069 |
| 2018/0053119 A1* | 2/2018 | Zeng | G06F 40/205 |
| 2018/0054464 A1* | 2/2018 | Zhang | H04L 51/02 |
| 2018/0054523 A1* | 2/2018 | Zhang | G06F 16/90332 |
| 2018/0075847 A1* | 3/2018 | Lee | G06F 16/24522 |
| 2018/0090141 A1 | 3/2018 | Periorellis et al. | |
| 2018/0144761 A1 | 5/2018 | Amini et al. | |
| 2018/0232664 A1* | 8/2018 | Gelfenbeyn | G06N 3/006 |
| 2018/0329884 A1 | 11/2018 | Xiong et al. | |
| 2022/0100756 A1* | 3/2022 | Bodigutla | G06F 16/248 |
| 2022/0108068 A1* | 4/2022 | Datla | G06N 3/006 |
| 2022/0199079 A1* | 6/2022 | Hanson | H04L 51/02 |
| 2022/0415320 A1* | 12/2022 | Zheng | G06F 40/237 |

OTHER PUBLICATIONS

Chen et al: "A Survey on Dialogue Systems:Recent Advances and New Frontiers"; aeXiv:1711.01731V3, Jan. 11, 2018, 13 Page Document.

Heudin: "An Emotional Muti-Personality Architecture for Intelligent Conversational Agents"; Springer Nature, 2018, LNCS 10780, pp. 143-163.

Heudin: "Emotion Selection in a Multi-Personality Conversational Agent"; Proceedings of the 9th International Conference on Agents and Artifical Intelligence (CAART 2017), pp. 34-41.

Majumder et al: "Deep Learning-Based Document Modeling for Personality Detection From Text"; IEEE Intelligent Systems, 2017, pp. 74-79.

Ren et al: "Context-Sensitive Twitter Sentiment Classification Using Neural Network": Proceedings of the Thirtieth AAAI Conference on Artifical Intelligence (AAAI-16), 2016, pp. 215-221.

Yang et al: "Exploring the Effect of Confusion in Discussion Forums of Massive Open Online Courses"; Proceedings of the Second ACM Conference on Learing@Scalef, 2015, pp. 121-130.

* cited by examiner

SYSTEM FOR MULTI-PERSPECTIVE DISCOURSE WITHIN A DIALOG

CROSS-REFERENCE TO PRIOR APPLICATIONS

This application is the U.S. National Phase application under 35 U.S.C. § 371 of International Application No. PCT/EP2020/050954, filed on Jan. 16, 2020, which claims the benefit of U.S. Provisional Patent Application No. 62/793,611, filed on Jan. 17, 2019. These applications are hereby incorporated by reference herein.

BACKGROUND

Dialog agents can be utilized by a computing system to converse with a user in a coherent structure. User interface input can be provided to a dialog agent in the form of text, speech, graphics, haptics, gestures, and/or other modes for communication. Similarly, dialog agents can formulate a response to user interface input, and can communicate output based on the response using text, speech, graphics, haptics, gestures, and/or other modes for communication. For example, a dialog agent can interpret and respond to statements made by a user in natural language.

SUMMARY

Techniques are described herein that enable an adaptive user-facing dialog agent that generates multiple candidate responses to user provided input, and selects a response from these candidate responses for presentation to the user using predetermined global dialog objectives. In many implementations, dialog agents can align a dialog with user provided input based on dialog features including: emotion, objective-relatedness, confusion, personality, verbosity, and/or additional dialog features. A user can set desired values corresponding to each dialog feature that a dialog agent will steer the dialog towards (e.g., a user can set values for global priority objectives for the dialog). For example, a user who desires a more natural human-like dialog with a dialog agent can set global priority values such that personality has a high value. As another example, a user who desires a detailed discussion with verbose answers can set values for global priority objectives such that verbosity has a high value. Additionally or alternatively, a user can provide values for multiple dialog features when setting values for global priority objectives. For example, a user desiring short and easy to understand responses can set global priority objectives such that verbosity has a low value. In many implementations, a dialog agent can have uniform global priority objective values across all users (e.g., a system administrator and/or an additional user with global permissions sets the values for the global priority objectives for all users who engage in a dialog with the dialog agent).

In many implementations, a user-facing dialog agent may include or be operably coupled with several sub-agents which each generate a candidate response by processing user provided input using a distinct machine learning model corresponding to each sub-agent (i.e., each sub-agent is associated with its own distinct machine learning model). Unless otherwise indicated, "dialog agent" as used herein refers to the user-facing dialog agent. In various implementations, each sub-agent (and each corresponding sub-agent machine learning model) is trained to generate a response that is tailored to one of the dialog features (and in some cases each sub-agent and its corresponding machine learning model is tailored to a distinct dialog feature).

A sub-agent machine learning model in accordance with many implementations can include an encoder portion and a decoder portion. The encoder portion of a sub-agent machine learning model can be a recurrent neural network (RNN), and can include one or more recurrent layers including combinations of unidirectional recurrent network layers and/or bi-directional recurrent network layers. Additionally or alternatively, the decoder portion of a sub-agent machine learning model can be a RNN, and can include one or more recurrent layers including combinations of unidirectional recurrent network layers and/or bi-directional recurrent network layers. Recurrent network layers can each include one or more memory units to which input can be sequentially applied and, at each iteration of applied input, the memory unit(s) can be utilized to calculate a new hidden state based on the input of that iteration and based on a current hidden state (that can be based on input(s) of prior iteration(s)). In some implementations, a memory unit can be a long short term memory (LSTM) unit. In some implementations, additional or alternative memory unit(s) may be utilized such as a gated recurrent unit (GRU). Additionally or alternatively, a sub-agent machine learning model can include additional network layers such as network layers to perform pooling (e.g., pooling over time layers), feed-forward network layers, and/or additional network layer(s).

After generating candidate responses, a user-facing dialog agent can select a response from the candidate responses to present to the user. In many implementations, feature monitor processes can determine a value for each dialog feature for each candidate response. A distance can be calculated between the values for features for each candidate response and the values for global priority objectives. Additionally or alternatively, the system can select the response with the shortest distance between the values for dialog features for each candidate response and the values for global priority objectives.

In many implementations, a dialog agent can provide the selected response to each of the sub-agents, and one or more weights in the machine learning model corresponding with each sub-agent can be updated by comparing the selected response with the candidate response generated by the sub-agent (e.g., backpropagation).

Providing multiple candidate responses aligning with multiple perspectives (i.e., dialog features) enables user-facing dialog agents to react to user provided input in multiple ways. For example, if a user-facing dialog agent determines a user is confused, responses can be selected to reduce the user's confusion which additionally or alternatively can reduce the likelihood a user will have to ask repeat questions, additional follow up questions, etc. In other words, by directing the dialog in a predefined manner dictated by the user (explicitly or inferred based on the user's input), information is more likely to be explained in a manner the user understands. A reduction of repeat questions, additional follow up questions, etc., can reduce computational resources used by the system including memory usage, processor usage, battery usage, and/or additional resources.

The above description is provided as an overview of various implementations disclosed herein. Those various implementations, as well as additional implementations, are described in more detail herein.

In some implementations, a method implemented by one or more processors is provided that includes receiving user interface input captured by a computing system during a dialog between a user and a user-facing agent that executes at least in part on the computing system. The method further includes processing the user interface input using a set of sub-agents by processing the user interface input using a trained machine learning model for each sub-agent to generate a set of candidate responses, where each sub-agent and each corresponding machine learning model is tailored to a different dialog feature in a set of dialog features. The method further includes processing each candidate response in the set of candidate responses using a set of feature monitoring processes to generate a set of dialog feature values corresponding to the set of dialog features for each candidate response. The method further includes selecting a response to the user interface input from the set of candidate responses by comparing the set of dialog feature values for each candidate response to a set of global priority objectives for the dialog, where the set of global priority objectives include predetermined values for each feature in the set of dialog features. The method further includes updating one or more aspects of each sub-agent with the selected response. The method further includes causing the computing system to render output from the user-facing agent based on the selected response.

These and other implementations of the technology disclosed herein can include one or more of the following features.

In some implementations, updating one or more aspects of each sub-agent with the selected response includes updating one or more weights in the machine learning model corresponding with each sub-agent by comparing the selected output with the candidate output corresponding to the particular sub-agent.

In some implementations, the machine learning model tailored to a different dialog feature for each sub-agent is trained by applying a first portion of a training instance as input to the machine learning model to generate predicted output, wherein the training instance is tagged as corresponding to the dialog feature using the set of feature monitoring processes. The method further includes updating one or more weights in the machine learning model by comparing the predicted output with a second portion of the training instance, wherein the second portion of the training instance is a response to the first portion of the training instance. In some versions of those implementations, each trained machine learning model includes an encoder recurrent neural network and a decoder recurrent neural network. In some versions of those implementations, the encoder recurrent neural network and the decoder recurrent neural network include long short term memory units.

In some implementations, selecting a response to the user interface input from the set of candidate responses by comparing the set of dialog feature values for each candidate response to a set of priority objectives for the dialog includes determining a distance between each set of dialog feature values and the predetermined values for each feature in the set of priority objectives. The method further includes selecting the candidate response corresponding to the shortest distance. In some versions of those implementations, determining a distance between each set of dialog feature values and the predetermined values for each feature in the set of priority objectives includes determining a Mahalanobis distance between each set of dialog feature values and the predetermined values for each feature in the set of priority objectives.

In some implementations, the set of dialog features includes at least emotion, confusion, objective relatedness, personality, and verbosity.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
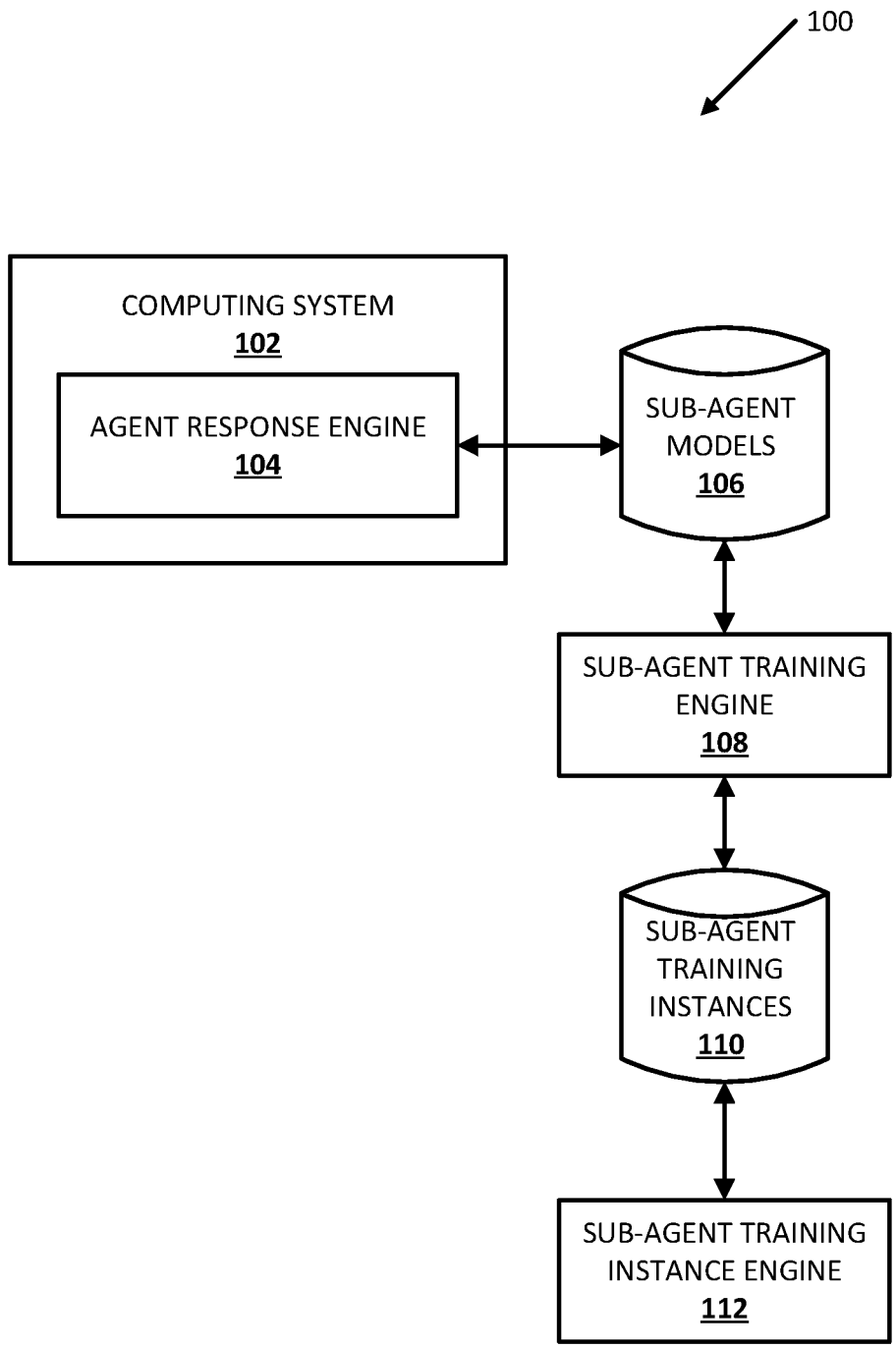
FIG. 1 is a block diagram of an example environment in which implementations disclosed herein may be implemented.

FIG. 1 illustrates an example environment in which implementations disclosed herein may be implemented. The example environment 100 in FIG. 1 includes computing system 102, agent response engine 104, sub-agent training engine 108, and sub-agent training instance engine 112. The computing system 102 may be, for example, a desktop computing device, a laptop computing device, a tablet computing device, and/or a mobile phone computing device. Additional and/or alternative computing devices may be provided.

Agent response engine 104, sub-agent training engine 108, and sub-agent instance training engine 112 are example components in which techniques described herein may be implemented and/or with which systems, components, and techniques described herein may interface. The operations performed by one or more engines 104, 108, 112 of FIG. 1 may be distributed across multiple computing systems. In some implementations, one or more aspects of engines 104, 108, 112 may be combined in a single system and/or one or more aspects may be implemented on the computing system 102. For example, in some of those implementations, aspects of sub-agent training engine 108 may be combined with aspects of sub-agent training instance engine 112. Engines in accordance with many implementations may each be implemented in one or more computing devices that communicate, for example, through a communication network. A communication network may include a wide area network such as the Internet, one or more local area networks (LANs) such as Wi-Fi LANs, mesh networks, etc. and/or one or more bus subsystems. A communication network may optionally utilize one or more standard communication technologies, protocols, and/or inter-process communication techniques.

In many implementations, computing system 102 can include a variety of modules to facilitate a dialog with a user. For example, computing system 102 can include, a speech capture module (not picture), a speech-to-text (STT) module (not pictured), a text-to-speech (TTS) module (not picture), a natural language processor (not pictured), and/or additional modules for use in communicating with a user. In many implementations, speech capture module, STT module, and/or TTS module may be implemented separately from computing system 102. In many implementations, speech capture module, STT module, and/or TTS module can generate output (e.g., a natural language data stream) based on a spoken input from a user. Additionally or alternatively, speech capture module, STT module, and/or TTS module may be configured to perform one or more functions: capture a user's speech, e.g., via a microphone; convert that captured audio to text (and/or other representations or embeddings); and/or convert text to speech.

In many implementations, computing system 102, e.g., by way of agent response engine 104, can perform various techniques describing herein, such as training sub-agent models 106, causing the sub-agent models to generate multiple candidate responses to user input, and/or selecting the candidate response closest to predefined global priority objectives (228 in FIG. 2, 318 in FIG. 3) as the selected response for the user. Sub-agent models 106 can be trained to generate responsive content tailored to a specific dialog feature(s), including but not limited to: emotion, objective-relatedness, confusion, personality, verbosity, and/or additional dialog features. For example, computing system 102 can have an emotion sub-agent model, an objective-relatedness sub-agent model, a confusion sub-agent model, a personality sub-agent model, a verbosity sub-agent model, and/or additional dialog feature model(s), each model corresponding to a different sub-agent.

In many implementations, each sub-agent model 106 may be trained, e.g., by sub-agent training engine 108, by retrieving a training instance from the sub-agent training instances 110. The sub-agent training instances can be generated by the sub-agent training instance engine 112 and, for example, can include training user input (e.g., a first portion of the training instance), known output for the given training user input (e.g., a second portion of the training instance), and one or more tags indicating which dialog feature(s) the training instance corresponds to. In many implementations, several dialog features can be represented in the same training instance, and therefore a training instance can be used to train several sub-agent models (e.g., a training instance can be tagged as having personality and verbosity, and can be used in training both a personality sub-agent model and/or a verbosity sub-agent model).

The sub-agent training engine 108 applies a first portion of the training instance as input to train a particular sub-agent model 106. In a variety of implementations, sub-agent model(s) 106 can be trained using supervised learning. For example, the sub-agent training engine 108 can generate predicted output by processing the training user input using the sub-agent model. Additionally or alternatively, sub-agent training engine 108 can compare the predicted output with the known output corresponding to the training user input and, using the comparison, update one or more weights in the corresponding sub-agent model 106 (e.g., backpropagate the difference over the entire sub-agent model 106). Process 500 of FIG. 5 describes a process of training a sub-agent model in accordance with many implementations disclosed herein.

In many implementations, each given sub-agent model 106 can include a variety of neural network layers, such as an encoder portion and/or a decoder portion. In many implementations, an encoder portion and/or a decoder portion can be a RNN, and can include a variety of recurrent network layers. For example, the encoder portion can include a combination of bi-directional recurrent network layer(s) and/or unidirectional recurrent network layer(s). Recurrent network layers can each include one or more memory units to which input can be sequentially applied and, at each iteration of applied input, the memory unit(s) can be utilized to calculate a new hidden state based on the input of that iteration and based on a current hidden state (that can be based on input(s) of prior iteration(s)). In some implementations, a memory unit can be a long short term memory (LSTM) unit. In some implementations, additional or alternative memory unit(s) may be utilized such as a gated recurrent unit (GRU). Additionally or alternatively, a sub-agent model can include additional network layers including network layers to perform pooling (e.g., pooling over time layers), feed-forward network layers, and/or additional network layer(s).

Figure 2:
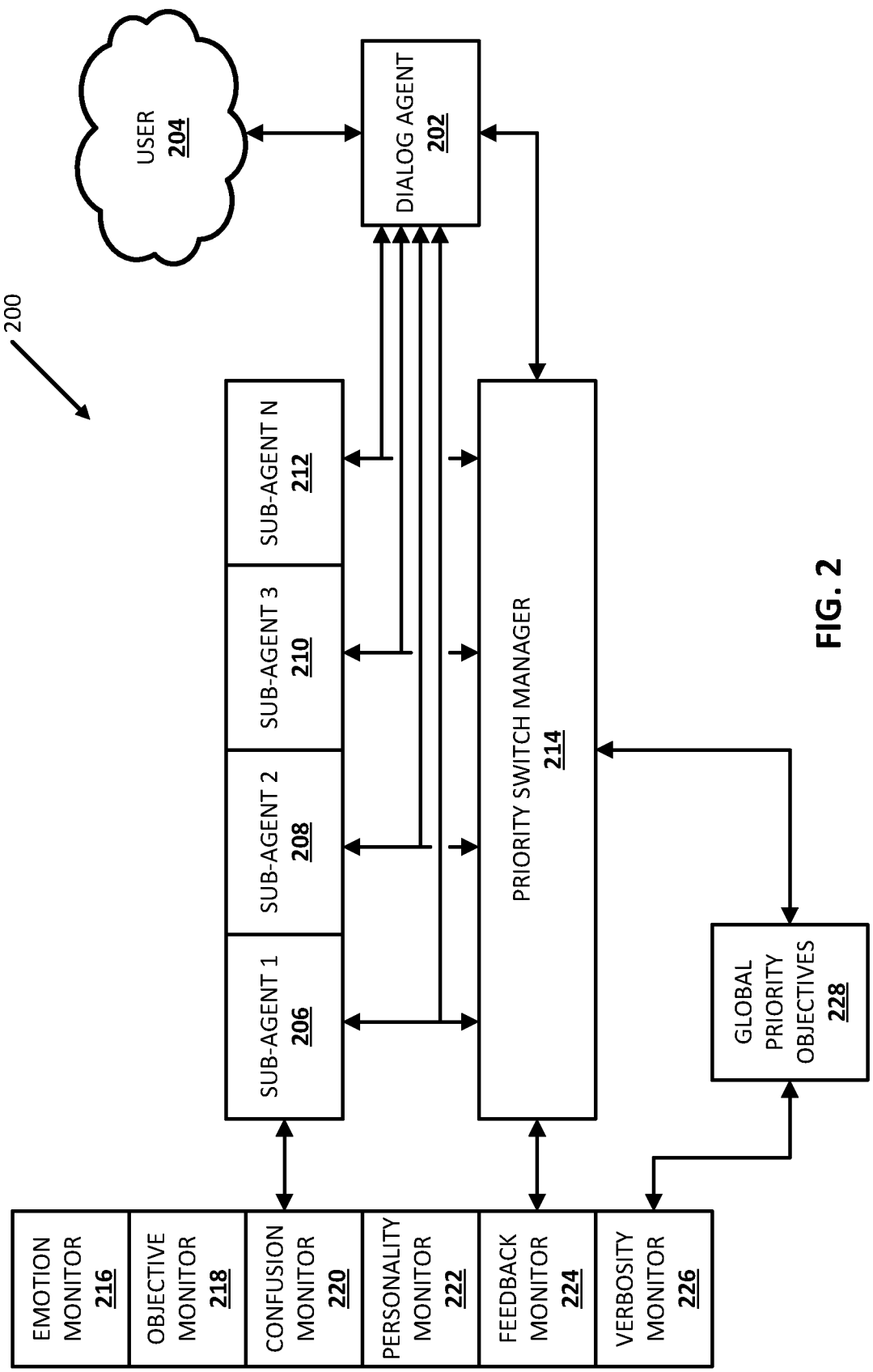
FIG. 2 is a block diagram of another example environment in which implementations disclosed herein may be implemented.

FIG. 2 illustrates another example environment in which implementations disclosed herein may be implemented. The example environment 200 in FIG. 2 includes user-facing dialog agent 202, user 204, sub-agent 1 206, sub-agent 2 208, sub-agent 3 210, sub-agent N 212, priority switch manager 214, emotion monitor 216, objective monitor 218, confusion monitor 220, personality monitor 222, feedback monitor 224, verbosity monitor 226, and global priority objectives 228.

Dialog agent 202 is a user-facing component of a computing system which facilitates the generation of a natural language response to user interface input provided by user 204. In some implementations, in response to receiving user interface input, sub-agents 206, 208, 210, 212 can each generate a candidate response for the user interface input, and a priority switch manager 214 (and/or the dialog agent 202) can select a response to present to user 204. It should be readily appreciated that sub-agents 206, 208, 210, 212 are merely illustrative and any number of sub-agents can generate candidate responses for a dialog agent. For example, a system can include three sub-agents, four sub-agents, five sub-agents, six sub-agents, etc.

Additionally or alternatively, monitor processes (such as emotion monitor 216, objective monitor 218, confusion monitor 220, personality monitor 222, feedback monitor 224, verbosity monitor 226) can determine the presence of dialog feature(s) in user interface input received from the user as well as the presence of dialog features in candidate responses generated by the sub-agents 206-212 and/or dialog agent 202. In some implementations, monitor processes can act asynchronously and do not directly affect the current dialog flow. In many implementations, priority switch manager 214 can determine a distance between each candidate response and predefined global priority objectives 228 in a multi-dimensional dialog space (see FIG. 3), and select the candidate response with the shortest distance. In other words, priority switch manager 214 (and/or dialog agent 202 itself) can act like a multi-objective function trying to optimize the values of all the parameters for each sub-agent such that it selects the response of the sub-agent that brings the entire dialog with the user closer to the values of the global priority objectives 228. In many implementations, the multi-objective function uses a Mahalanobois distance to identify the distance between the values of the global priority objectives 228 and the current state of the dialog. The goal is to pick the candidate response that brings the current state (e.g., a multidimensional vector) the closest to the global priority objectives 228.

In many implementations, one or more functions of priority switch manger 214 can be implemented directly by dialog agent 202 (e.g., without the use of priority switch manager 214). The priority switch manager 214 and/or dialog agent 202 can feed the selected response back to all the sub-agents. In many implementations, one or more weights in the machine learning model associated with each sub-agent can be updated by determining a difference between the sub-agent's candidate response and the selected response (i.e., backpropagation). In many implementations, the machine learning model corresponding to the sub-agent which generated the selected response will remain unchanged since there is no difference between the selected response and the response generated at that sub-agent.

Figure 3:
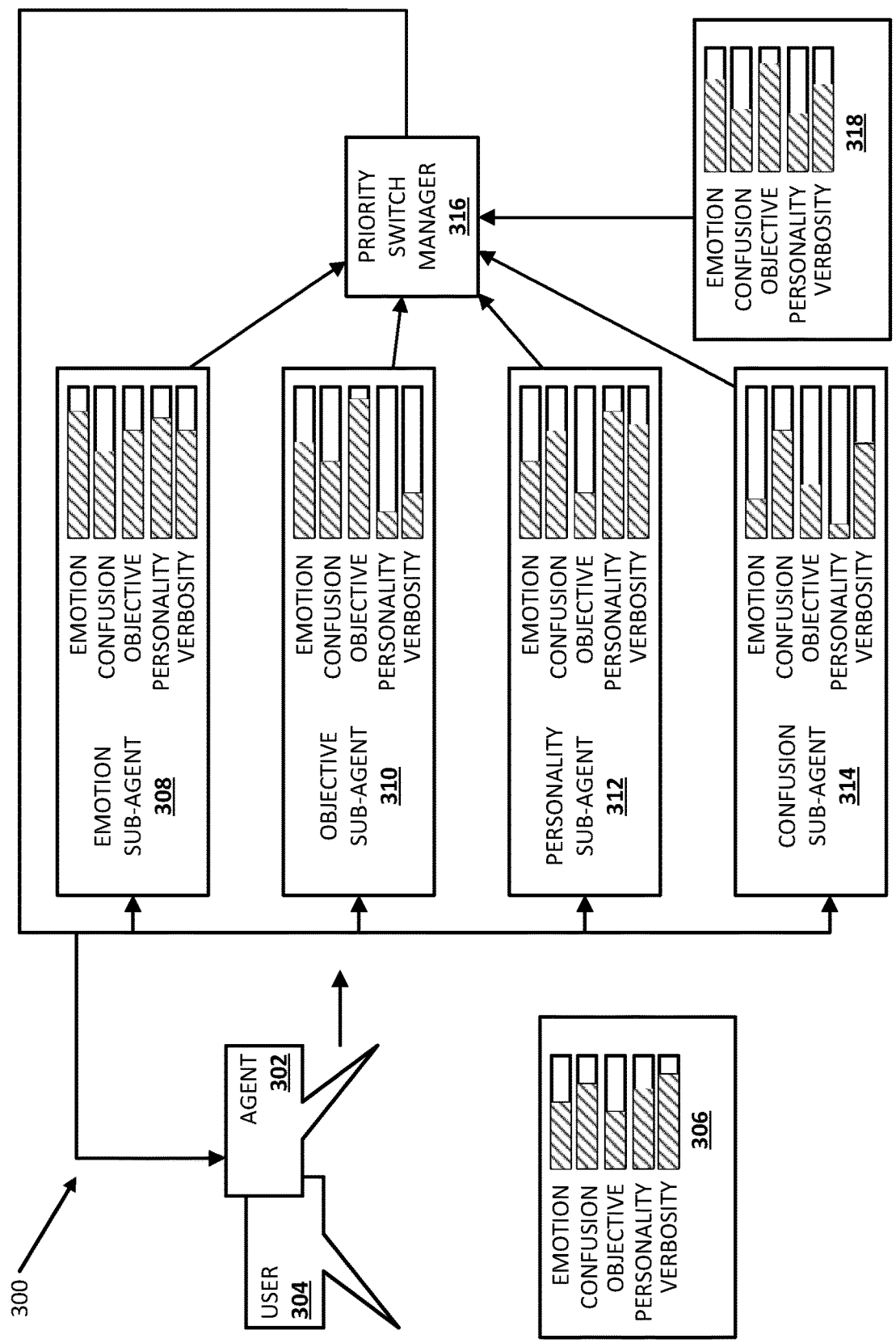
FIG. 3 illustrates an example dialog space according to implementations disclosed herein.

FIG. 3 illustrates an example dialog space 300 in accordance with a variety of implementations described herein. Dialog space 300 is a multi-dimensional space encompassing a dialog between an agent 302 (which may correspond to 202) and a user 304 (which may correspond to 204). In many implementations, the feature monitor processes (not pictured) can be used in determining values 306 for one or more dialog features. For example, values 306 can include values for several dialog features such as emotion, confusion, objective, personality, verbosity, and/or additional dialog features including word length, phrase length, dialog time, word complexity, etc. Additionally or alternatively, values for dialog features in candidate responses can similarly be determined. For example, values for dialog features can be determined for candidate responses generated by emotion sub-agent 308, objective sub-agent 310, personality sub-agent 312, and/or confusion sub-agent 314. In a variety of implementations, priority switch manager 316 (and/or the dialog agent 302) can select a response from the candidate responses generated by sub-agents 308, 313, 312, 314 using global priority objectives 318 (which may be similar to 228).

Figure 4:
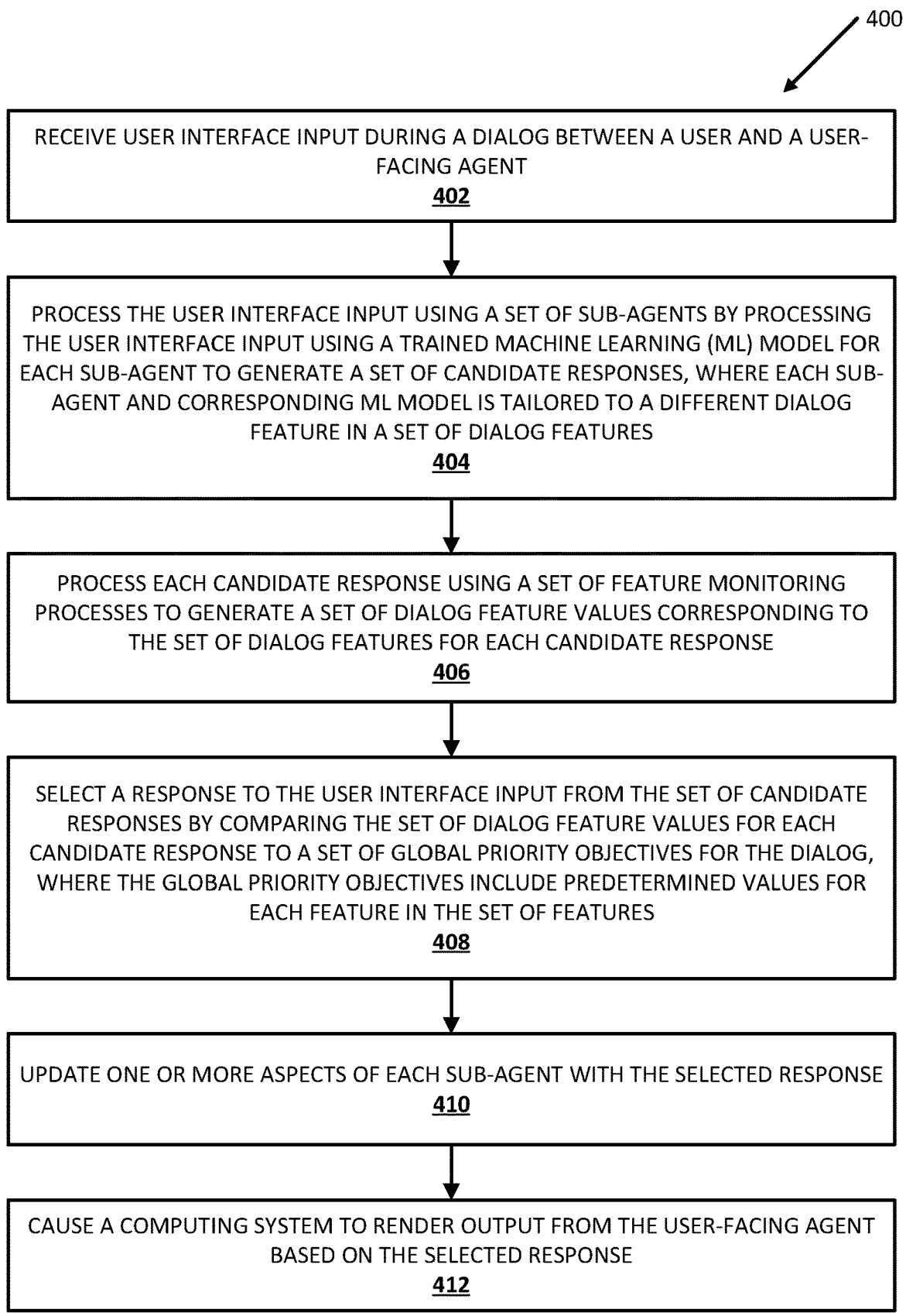
FIG. 4 is a flowchart illustrating a process of generating a response to user interface input according to implementations disclosed herein.

FIG. 4 is a flowchart illustrating an example process 400 of generating and selecting a response to user interface input using sub-agents according to various implementations disclosed herein. For convenience, the operations of FIG. 4 are described with reference to a system that performs the operations. This system may include various components of various computer systems, such as one or more components of computing system 102. Moreover, while operations of process 400 are shown in a particular order, this is not meant to be limiting. One or more operations may be reordered, omitted, and/or added.

At block 402, the system receives user interface input during a dialog between a user and a user-facing dialog agent. In many implementations, the dialog is text based (e.g., the user provides text input and the dialog agent generates a text response for the user). In many implementations, the dialog is a spoken conversation (e.g., the user provides spoken input and the dialog agent generates an audio response for the user).

At block 404, the system processes the user interface input using a set of sub-agents (e.g., 206-212) by processing the user interface input using a trained machine learning model (e.g., 106) for each sub-agent to generate a set of candidate responses. In many implementations, each sub-agent and corresponding machine learning model is tailored to a different dialog feature in a set of dialog features. For example, a system can include a sub-agent (and corresponding sub-agent machine learning model) corresponding to a distinct dialog feature.

At block 406, the system processes each candidate response using a set of feature monitoring processes to generate a set of dialog feature values corresponding to the set of dialog features for each candidate response. In many implementations, a system can include a distinct feature monitoring process for each dialog feature. For example, the system can include an emotion feature monitoring process which can measure the presence of the emotion feature in dialog to generate a value corresponding to an amount of emotion in the dialog.

At block 408, the system selects a response to the user interface input from the set of candidate responses by comparing the set of dialog feature values for each candidate response to a set of global priority objectives 228/318 for the dialog. In many implementations, the global priority objectives include predetermined values for each feature in the set of dialog features.

At block 410, the system updates one or more aspects of each sub-agent with the selected response. For example, one or more weights in a machine learning model corresponding with a particular sub-agent can be updated by determining a difference between the selected response and the candidate response generated by the particular sub-agent (e.g., backpropagation).

At block 412, the system causes the computing system to render output from the user-facing agent based on the selected response. In many implementations, the output can be text, audio, and/or additional output.

Figure 5:
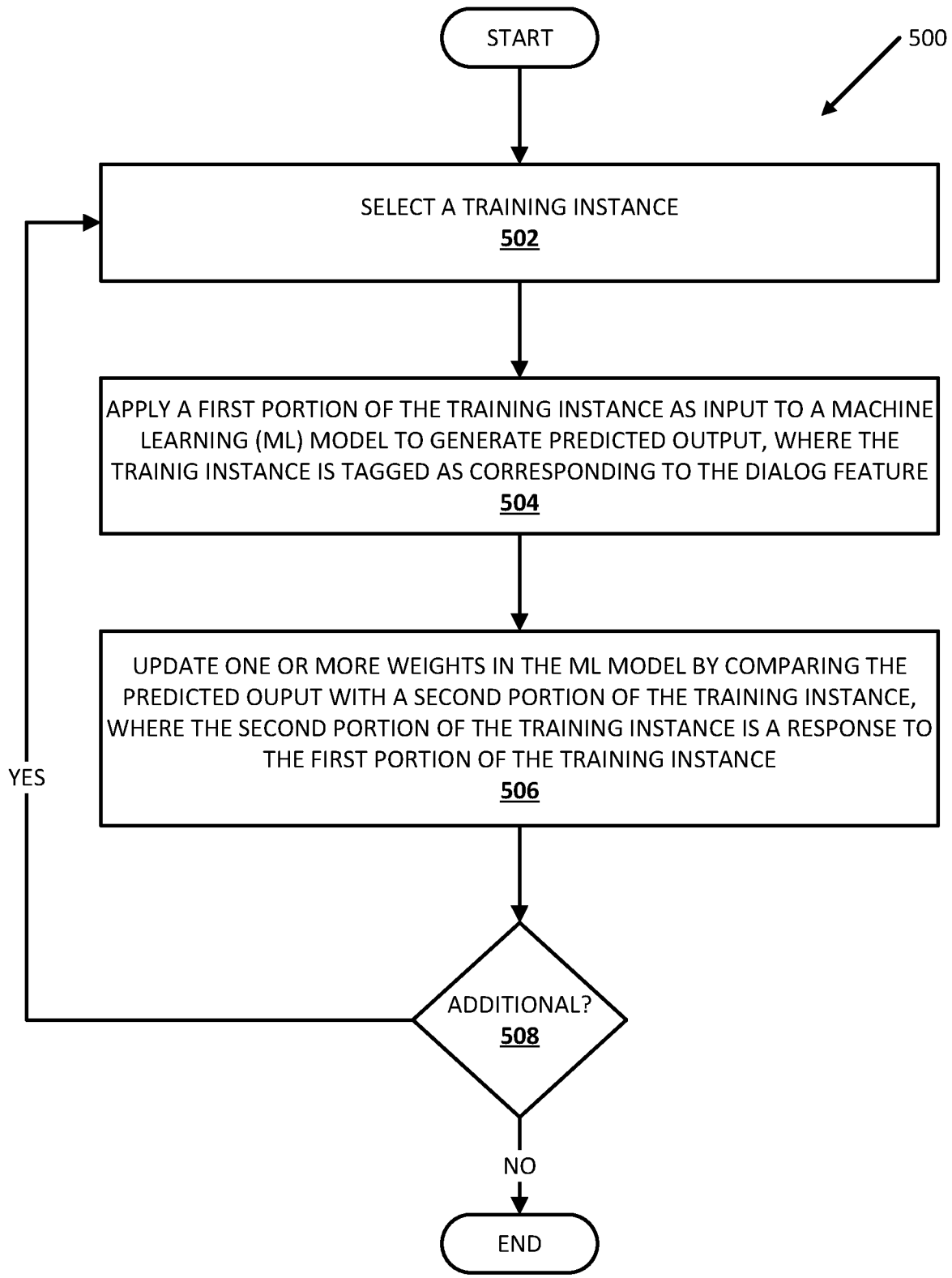
FIG. 5 is a flowchart illustrating a process of training a sub-agent machine learning model according to implementations disclosed herein.

FIG. 5 is a flowchart illustrating an example process 500 of training a sub-agent model according to various implementations disclosed herein. For convenience, the operations of FIG. 5 are described with reference to a system that performs the operations. This system may include various components of various computer systems, such as one or more components of computing system 102. Moreover, while operations of process 500 are shown in a particular order, this is not meant to be limiting. One or more operations may be reordered, omitted, and/or added.

At block 502, the system selects a training instance. In many implementations, a training instance can include at least a first portion (e.g., training user input), a second portion (e.g., a response to the first portion), and one or more tags corresponding to dialog feature(s) in training instance dialog. In many implementations, one or more dialog feature monitoring processes can be utilized to determine the presence of dialog feature(s) in a training instance. In many implementations, dialog can be tagged at the sentence level, the conversation turn level (i.e., a portion of dialog from the user and a response to that portion of dialog, either portion may be longer than a sentence), etc.

At block 504, the system applies the first portion of the training instance as input to a sub-agent machine learning model to generate predicted output. In many implementations, the machine learning model has an encoder portion and a decoder portion. In some such implementations, the first portion of the training instance can be applied to the encoder portion of the sub-agent machine learning model to generate encoder output. Additionally or alternatively, encoder output can be applied as input to the decoder portion of the sub-agent machine learning model to generate the predicted output.

At block 506, the system updates the machine learning model based on the predicted output generated by the training instance and the second portion of the training instance. For example, the system can determine an error based on the generated output and the second portion of the training instance, and backpropagate the error over the machine learning model to update one or more weights of the sub-agent model.

At block 508, the system determines whether there are one or more additional unprocessed training instances. If so, the system proceeds back to 502, selects an additional training instance, then performs blocks 504 and 506 based on the additional unprocessed training instance. In some implementations, at block 508 the system may determine not to process any additional unprocessed training instances if one or more training criteria has been satisfied (e.g., a threshold number of epochs have occurred, a threshold duration of training occurred, and/or all training instances have been processed). Although process 500 is described with respect to a non-batch learning technique, batch learning may additionally and/or alternatively be utilized.

Figure 6:
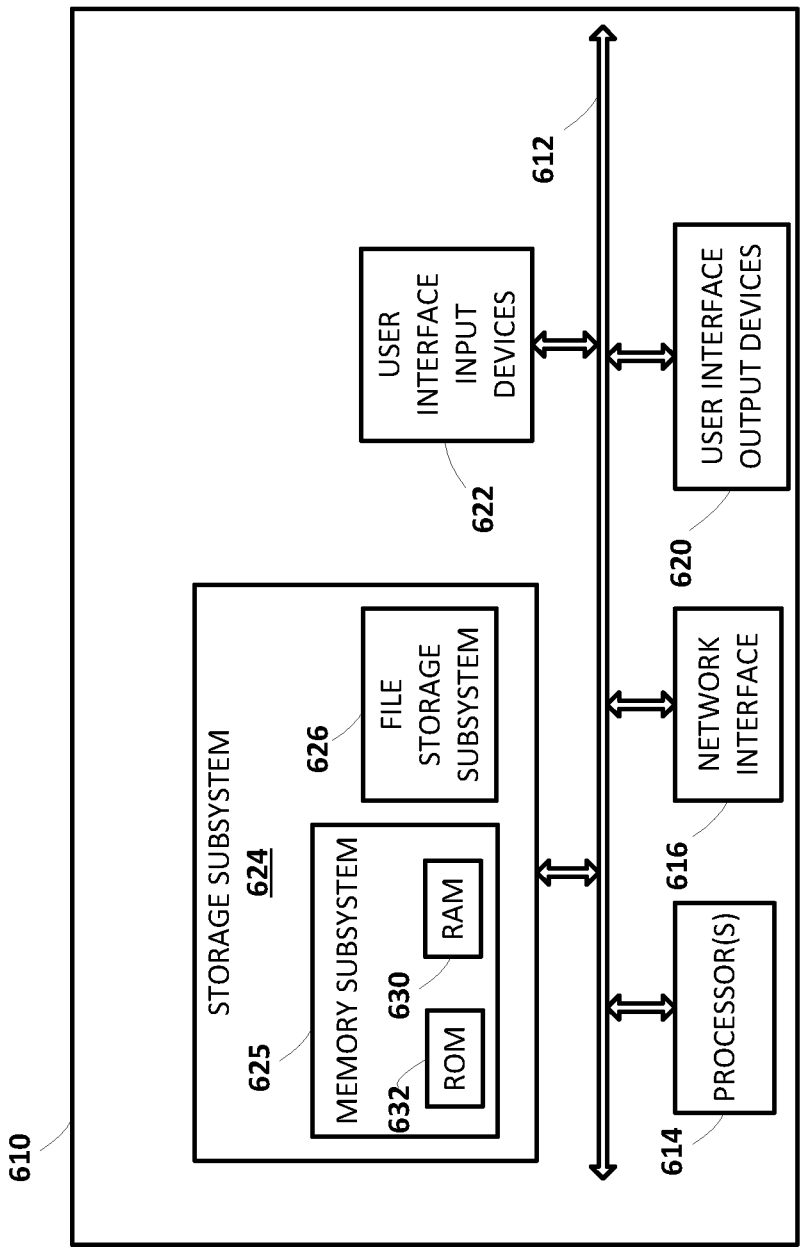
FIG. 6 illustrates an example architecture of a computing device.

FIG. 6 is a block diagram of an example computing device 610 that may optionally be utilized to perform one or more aspects of techniques described herein. In some implementations, one or more of a client computing device, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of one or more of the processes of FIGS. 4-5, as well as to implement various components depicted in FIG. 1.

These software modules are generally executed by processor 614 alone or in combination with other processors.

Memory 625 used in the storage subsystem 624 can include a number of memories including a main random access memory ("RAM") 630 for storage of instructions and data during program execution and a read only memory ("ROM") 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving user interface input captured by a computing system during a dialog between a user and a user-facing agent that executes at least in part on the computing system;
   processing the user interface input using a set of sub-agents by processing the user interface input using a trained machine learning model for each sub-agent to generate a set of candidate responses, wherein each sub-agent and each corresponding trained machine learning model is tailored to a different dialog feature in a set of dialog features;

processing each candidate response in the set of candidate responses using a set of feature monitoring processes to generate a set of dialog feature values corresponding to the set of dialog features for each candidate response;

selecting a response to the user interface input from the set of candidate responses by comparing the set of dialog feature values for each candidate response to a set of global priority objectives for the dialog, wherein the set of global priority objectives include predetermined values for each feature in the set of dialog features;

updating one or more aspects of each sub-agent with the selected response; and causing the computing system to render output from the user-facing agent based on the selected response.

2. The method of claim 1, wherein updating one or more aspects of each sub-agent with the selected response comprises:

updating one or more weights in the trained machine learning model corresponding with each sub-agent by comparing the selected response with the candidate response corresponding to a particular sub-agent.

3. The method of claim 1, wherein the trained machine learning model tailored to a different dialog feature for each sub-agent is trained by:

applying a first portion of a training instance as input to the trained machine learning model to generate predicted output, wherein the training instance is tagged as corresponding to a dialog feature using the set of feature monitoring processes; and updating one or more weights in the trained machine learning model by comparing the predicted output with a second portion of the training instance, wherein the second portion of the training instance is a response to the first portion of the training instance.

4. The method of claim 3, wherein each trained machine learning model includes an encoder recurrent neural network and a decoder recurrent neural network.

5. The method of claim 4, wherein the encoder recurrent neural network and the decoder recurrent neural network include long short term memory units.

6. The method of claim 1, wherein selecting a response to the user interface input from the set of candidate responses by comparing the set of dialog feature values for each candidate response to a set of priority objectives for the dialog comprises:

determining a distance between each set of dialog feature values and the predetermined values for each feature in the set of priority objectives; and selecting a candidate response corresponding to a shortest distance.

7. The method of claim 6, wherein determining a distance between each set of dialog feature values and the predetermined values for each feature in the set of priority objectives comprises:

determining a Mahalanobis distance between each set of dialog feature values and the predetermined values for each feature in the set of priority objectives.

8. The method of claim 1, wherein the set of dialog features includes at least emotion, confusion, objective relatedness, personality, and verbosity.

9. At least one non-transitory computer-readable medium comprising instructions that, in response to execution of the instructions by one or more processors, cause one or more processors to perform the following operations:

receiving user interface input captured by a computing system during a dialog between a user and a user-facing agent that executes at least in part on the computing system;

processing the user interface input using a set of sub-agents by processing the user interface input using a trained machine learning model for each sub-agent to generate a set of candidate responses, wherein each sub-agent and each corresponding trained machine learning model is tailored to a different dialog feature in a set of dialog features;

processing each candidate response in the set of candidate responses using a set of feature monitoring processes to generate a set of dialog feature values corresponding to the set of dialog features for each candidate response;

selecting a response to the user interface input from the set of candidate responses by comparing the set of dialog feature values for each candidate response to a set of global priority objectives for the dialog, wherein the set of global priority objectives include predetermined values for each feature in the set of dialog features;

updating one or more aspects of each sub-agent with the selected response; and causing the computing system to render output from the user-facing agent based on the selected response.

10. The at least one non-transitory computer-readable medium of claim 9, wherein updating one or more aspects of each sub-agent with the selected response comprises: updating one or more weights in the trained machine learning model corresponding with each sub-agent by comparing the selected response with the candidate response corresponding to a particular sub-agent.

11. The at least one non-transitory computer-readable medium of claim 9, wherein the trained machine learning model tailored to a different dialog feature for each sub-agent is trained by:

applying a first portion of a training instance as input to the trained machine learning model to generate predicted output, wherein the training instance is tagged as corresponding to the dialog feature using the set of feature monitoring processes; and updating one or more weights in the trained machine learning model by comparing the predicted output with a second portion of the training instance, wherein the second portion of the training instance is a response to the first portion of the training instance.

12. The at least one non-transitory computer-readable medium of claim 11, wherein each trained machine learning model includes an encoder recurrent neural network and a decoder recurrent neural network.

13. The at least one non-transitory computer-readable medium of claim 12, wherein the encoder recurrent neural network and the decoder recurrent neural network include long short term memory units.

14. The at least one non-transitory computer-readable medium of claim 9, wherein selecting a response to the user interface input from the set of candidate responses by comparing the set of dialog feature values for each candidate response to a set of priority objectives for the dialog comprises:

determining a distance between each set of dialog feature values and the predetermined values for each feature in the set of priority objectives; and selecting a candidate response corresponding to a shortest distance.

15. A system comprising one or more processors and memory operably coupled with the one or more processors, wherein the memory stores instructions that, in response to execution of the instructions by one or more processors, cause the one or more processors to perform the following operations:
  receiving user interface input captured by a computing system during a dialog between a user and a user-facing agent that executes at least in part on the computing system;
  processing the user interface input using a set of sub-agents by processing the user interface input using a trained machine learning model for each sub-agent to generate a set of candidate responses, wherein each sub-agent and each corresponding trained machine learning model is tailored to a different dialog feature in a set of dialog features;
  processing each candidate response in the set of candidate responses using a set of feature monitoring processes to generate a set of dialog feature values corresponding to the set of dialog features for each candidate response;
  selecting a response to the user interface input from the set of candidate responses by comparing the set of dialog feature values for each candidate response to a set of global priority objectives for the dialog, wherein the set of global priority objectives include predetermined values for each feature in the set of dialog features;
  updating one or more aspects of each sub-agent with the selected response; and
  causing the computing system to render output from the user-facing agent based on the selected response.

* * * * *